United States Patent [19]

Christianson et al.

[11] Patent Number: 4,827,414
[45] Date of Patent: May 2, 1989

[54] MONITORING SYSTEM AND METHOD FOR NUCLEAR WEAPONS EFFECTS DETECTION AND DAMAGE ASSESSMENT

[76] Inventors: Charles L. Christianson, 7307 Brooklyn Bridge Rd., Laurel, Md. 20707; Jay S. Hall, 1312 Breeze Way Dr., Annapolis, Md. 21401

[21] Appl. No.: 752,703

[22] Filed: Jul. 8, 1985

[51] Int. Cl.$^4$ ............................ G05F 7/00; G05F 1/10
[52] U.S. Cl. .................................... 364/423; 374/143; 73/753; 73/35
[58] Field of Search ............ 250/390 R, 336.1, 363 R; 276/914, 273, 247, 153–155; 73/714, 753–754, 35; 374/142, 143, 121; 364/423

[56] References Cited

U.S. PATENT DOCUMENTS

| | | | |
|---|---|---|---|
| 3,558,865 | 3/1967 | Berndt | 364/423 |
| 3,736,411 | 3/1971 | Berndt | 364/423 |
| 4,393,509 | 7/1983 | Merkel | 434/218 |
| 4,536,841 | 8/1985 | Waechter | 250/388 |
| 4,564,753 | 1/1986 | Van Aller | 250/207 |
| 4,620,800 | 11/1986 | Anno | 376/247 |

*Primary Examiner*—Jerry Smith
*Assistant Examiner*—Gail O. Hayes

[57] ABSTRACT

A system for detecting a nuclear weapon explosion and assessing damage therefrom comprising a sensor head and an electronic signal processor is disclosed. The sensor head is spherical in shape and comprises a plurality of temperature sensors at different locations on the sensor head and provide information concerning the direction of the radiation. Elapsed time between thermal pulse peaks measure yield of the weapon. A plurality of pressure sensors embedded in the sensor head measure blast overpressure. The time lapse between the temperature and pressure signals measures distance. Gamma and neutron sensors indicate the type of weapon and radiation hazard. The electronic signal processor provides the necessary calculations.

12 Claims, 2 Drawing Sheets

MONITORING SYSTEM AND METHOD FOR NUCLEAR WEAPONS EFFECTS DETECTION AND DAMAGE ASSESSMENT

BACKGROUND OF THE INVENTION

1. Field of the Invention

The present invention relates generally to automated monitoring systems having electronic processors, but more specifically, the present invention relates to a monitoring system and method for nuclear weapons effects detection and damage assessment.

2. Description of the Prior Art

At the present time, the techniques for monitoring and detecting, at the earliest possible time, effects from a nuclear (atomic and/or thermonuclear) weapon so as to determine damage to a ship's structure, weapons, sensors and personnel are very limited in scope and totally inadequate in utility and effectiveness. The present radiation detection, indication and computation (RADIAC) equipment is composed of a fixed gamma dose and dose rate equipment mounted on the ship's mast or above the deck. The foregoing device is adequate for its intended use; however, this equipment reads gamma radiation only. Consequently, there is no neutron capability. Also, this device measures the free field total radiation to the ship, not the dose to personnel. The dose to personnel is the real criteria for determining injuries and/or the combat effectiveness of personnel.

In addition, dosimeters presently designed for personnel use have a dose range less than the previously mentioned equipment and are also for gamma only. Moreover, the dosimeter has to be worn by the personnel in order to be effective in indicating the dose rate to the body. Also, in a nuclear warfare situation these dosimeters may saturate and therefore be useless to determine personal injury.

There are other equipments designed primarily for measurement of fallout radiation only. The initial or prompt radiation would therefore have come and gone before these devices could be put into operation. In addition, these devices, would not be able to resolve high peak intensities.

Ships presently have no capability then to detect a nuclear blast pulse, thermal pulse or electromagnetic pulse (EMP). In addition, ships have no capability to accurately determine nuclear battle damage from a nuclear weapon to the ship's structure, weapons or communication systems other than a visual survey, a task which is unrealistic in a nuclear war environment.

OBJECTS OF THE INVENTION

Accordingly a principal object of the present invention is to configure a monitoring system for detecting, at the earliest possible time, the effects of a nuclear (atomic and/or thermonuclear) weapon in an improved manner.

Another object of the present invention is to monitor the associated effects of thermal, ionizing, and air for prediction of damage to the ship and personnel.

Another object of the present invention is to determined the characteristics of the nuclear explosion, i.e., yield, elevation, distance to ground zero and type of weapon.

SUMMARY OF THE INVENTION

The primary purpose of the present invention is to have available an immediate knowledge of the effects of a nuclear explosion and/or attack so that command decisions, strategy and countermeasures can quickly ensue.

The essence of the present invention is in detecting predetermined signals which are believed sufficient to characterize a nuclear weapon explosion and to assess damage from certain known characteristics of the predetermined signals.

The purpose of the present invention is carried-out by configuring the monitoring system to comprise a sensor head and an electronic signal processor. The sensor head is spherical shape and comprises a plurality of temperature sensors disposed at different locations on the surface of the sensor head so as to provide information direction of radiation. Also, disposed on the surface of the sensor head are a plurality of pressure sensors, low and high intensity gamma sensors, and low and high intensity neutron sensors. The signals generated by the foregoing sensors are detected and processed in an electronic signal processor including a microprocessor and a read-only memory (ROM) which coact to calculate predetermined derived quantities, such as peak pressure, distance to ground zero, the yield of the weapon, for example.

BRIEF DESCRIPTION OF THE DRAWINGS

The foregoing objects, other objects, novel features and advantages of the present invention will be more apparent from the following more particular description of a preferred embodiment as illustrated in the accompanying drawings, in which.

DESCRIPTION OF THE PREFERRED EMBODIMENT

Figure 1:
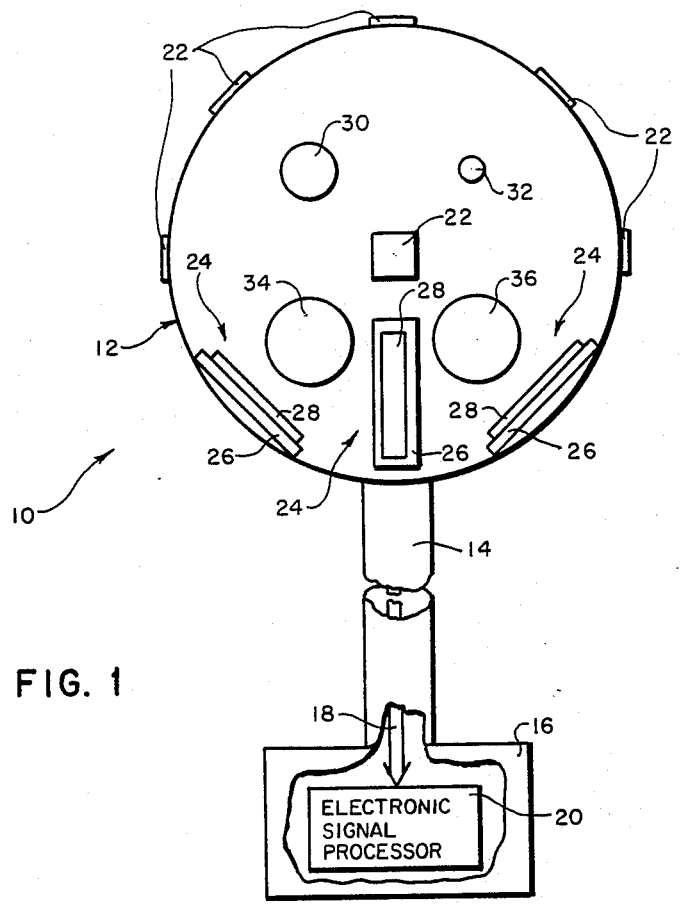
FIG. 1 is a schematic diagram of the monitoring system according to the present invention depicting, inter alia, the sensor head disposed on a ship's mass and the thermally isolated electronic signal processor.

FIG. 1 is a schematic diagram of a monitoring system 10 in which the present invention is employed to detect predetermined signals which are sufficient to characterize a nuclear weapon explosion and to assess damage from certain known characteristics of the predetermined signals. The monitoring system 10 comprises a sensor head 12 preferably spherical in shape and of aluminum connected to a ship's mast 14 high above a thermally isolated control center 16. The sensor head 12 is connected via a protected umbilical cable 18 which is inside the ship's mast 14. The protected umbilical cable 18 connects to an electronic signal processor 20 which is housed in the aforementioned thermally isolated control center 16.

To continue, the sensor head 12 comprises a plurality of temperature sensors 22 strategically disposed on its surface about its top half, and a plurality of blast overpressure (pressure) sensors 24. Each one of the plurality of pressure sensors 24 comprises a plate 26 affixed to the inside surface of the sensor head 12 and a corresponding strain gauge 28 affixed to the plate 26. The sensor head 12 further comprises a low intensity gamma sensor 30, a high intensity gamma sensor 32, a low intensity neutron sensor 34, and a high intensity neutron sensor 36. FIG.

2 shows the typical responses from the aforementioned sensors. Note that the thermal radiation or temperature signal has two peaks in the time interval depicted, and that the blast overpressure or pressure signal has a positive pressure response and a negative pressure response during the time interval of interest. Also, both the gamma and neutron signals are substantially similar in shape and amplitude.

Figure 3:
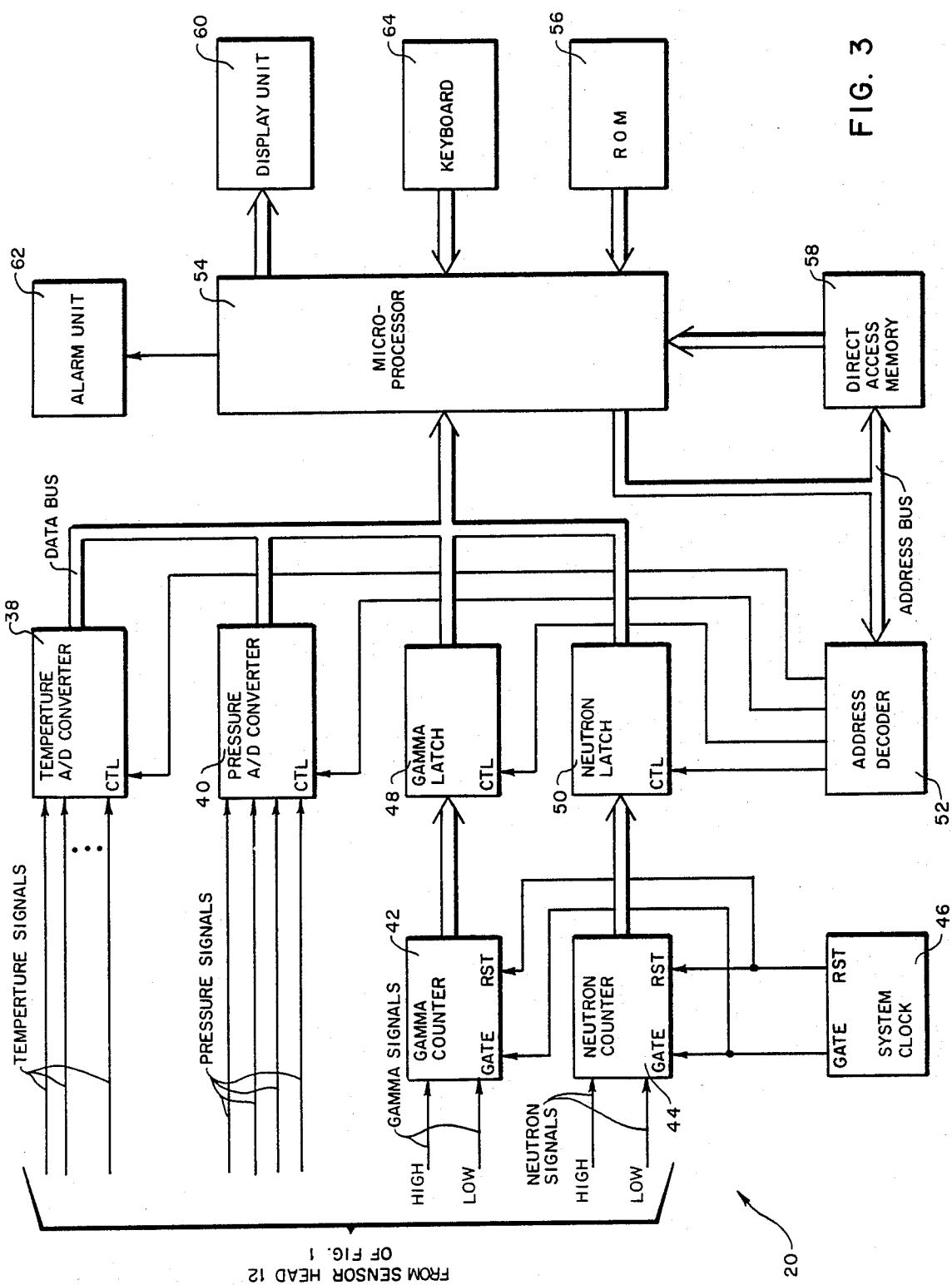
FIG. 3 is a detailed block diagram representation of the electronic signal processor of FIG. 1.

FIG. 3 is a detailed block diagram representation of the electronic signal processor 20. It comprises a temperature analog-to-digital (A/D) converter 38 and a pressure analog-to-digital (A/D) converter 40 for converting the purely analog temperature and pressure signals into respective digital representations. The electronic signal processor 20 further comprises a gamma counter 42 and a neutron counter 44 for counting the signal representation of the gamma signals and neutron signals when properly clocked by the system clock 46. The outputs of the gamma counter 42 and the neutron counter 44 drive a gamma latch 48 and a neutron latch 50, respectively. The foregoing latches, and, also, the temperature A/D converter 38 and the pressure A/D converter 40 are addressed by an address decoder 52. The addresses are generated by a microprocessor 54 under control of a read-only memory (ROM) 56. The foregoing addresses also drive a direct access memory 58, which, in turn, is operatively connected to the microprocessor 54. A display unit 60 for displaying predetermined assessments of the nuclear damage based certain characteristics of the predetermined signals, and an alarm unit 62 for sounding an alarm upon the detection of any one of the predetermined signals is also operatively connected to the microprocessor 54. A keyboard for inputting data, initiating the system, and formatting data is also connected to the microprocessor 54.

STATEMENT OF THE OPERATION

Figure 2:
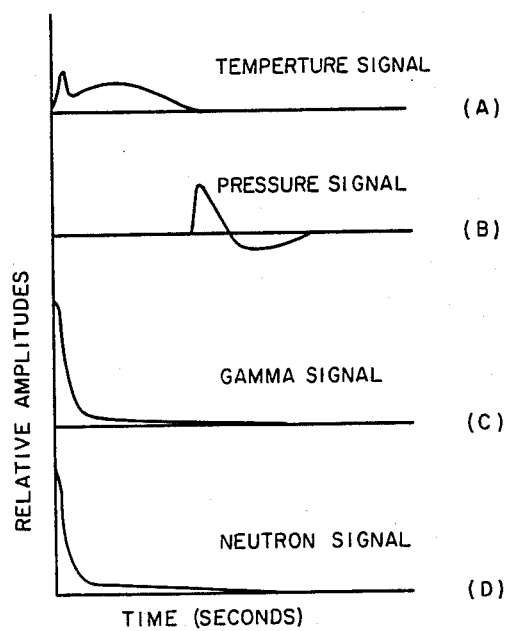
FIG. 2 is a waveform diagram depicting examples of typical signals detected by the various sensors disposed on the main sensor head of FIG. 1.

Details of the operation and the method, according to the present invention, are explained in conjunction with FIGS. 1, 2 and 3, as viewed concurrently.

Each one of the temperature sensor 22 is a thermocouple embedded in a copper block attached to the surface of the sensor head 12. The copper block acts as a heat sink. The thermocouple is calibrated for temperature and the assembly consists of thermocouple, the copper block, and circuitry calibrated to thermal intensity in terms of calories per square centimeter. In the preferred embodiment, there are twelve of the temperature sensors 22. Anticipated range for the thermal radiation intensity is 1 calorie per centimeter square to 50 calories per centimeter square.

Each of the pressure sensors 24 are securely fastened to the sensor head 12. An incident blast wave will deform and flex the plates 26 of the overpressure pressure sensors 24 in proportion to the intensity of the wave front. The strain gauge 28 is cemented to the plate 26, and, accordingly, will change its resistance indicating the pressure intensity of the wave front. The anticipated range for pressure is 1 pound per square inch to 30 pounds per square inch.

For purposes of the present invention, the low intensity gamma sensor 30 is a halogen Geiger-Mueller (GM) tube. The tube is operated at a high voltage of approximately 700 to 1000 volts and filled with a halogen quencher. The high intensity gamma sensor 32 is a recycling ion chamber, which is argon filled under high pressure. When the ionization chamber sees an ionizing gamma radiation field, its electrical charge is drained through the gas dielectric causing an encased electrometer tube to drop its cathode to grid impedance. A relaxation oscillator is connected to the grid of the tube, and every time its cathode-to-grid impedance reaches a predetermined low value, it generates an output.

The low intensity neutron sensor 34 is essentially a GM tube filled with $B^{10}F_3$ in addition to a halogen counting gas. The detector portion is surrounded by moderator/attenuator material. The ionizing radiation discharges the tube producing pulse rates proportional to the intensity of the incident radiation. For the high intensity neutron sensor 36, the configuration and operation is similar except that the detection tube is much smaller and surrounded by thicker shielding.

Referring now specifically to FIG. 3, in operation, the keyboard 64 is used to reset or initiate operation. The signals from the sensor head 12 as previously mentioned, are temperature, pressure, gamma counts per minute and neutron counts per minute. The temperature and pressure signals are pure analog signals and are fed to the A/D converters 38 and 40, respectively. The A/D converters 38 and 40 each operates on the analog signals and converts them into digital signals. The gamma latch 48, the neutron latch 50 and the aforementioned A/D converters 38 and 40 perform similar functions. Namely, they provide gating of their output data onto the data bus as keyed in by the address bus via the address decoder 52. When it is time to gate the signals onto the data bus and into the microprocessor 54, the microprocessor 54 puts out an address onto the address bus. This address is decoded in the address decoder 52, which then pulses the control (CTL) inputs of the A/D converters or latches of interest. A system clock 46 is necessary to gate the gamma counter 42 and the neutron counter 44 via their gate inputs as shown. After the count in the gamma counter 42 or the neutron counter 44 has been stored in the gamma latch 48 or neutron latch 50, respectively, the system clock 46 resets the counter of interest back to zero so that the count can start again during the next time interval. The foregoing is accomplished via the reset (RST) output of the system clock 46 and the corresponding reset (RST) inputs of the gamma counter 42 and the neutron counter 44. The system clock 46 establishes the count interval. For example, if the interval is to be a long, the system clock 46 will generate a gate pulse once a minute and a reset pulse once a minute. To continue, the signals are gated onto the data bus by the addresses from the microprocessor 54 to the address decoder 52 which gates the A/D converter or latch of interest. Once the signals are gated onto the data bus, access the direct access memory 58 where they are stored in predetermined locations. After the data are stored, this information is available for internal use and computation by the microprocessor 54.

Under control of the microprocessor 54, the data stored in the direct access memory 58 are converted into a more useful form. For example, pressure information is stored in the direct access memory 58, but what is really desired is the distance from ground zero. The distance to ground zero is given by the time difference in the arrival of the peaks of the thermal and pressure waves. The time varying pressure and temperature signals are stored in the direct access memory 58 and the differences in the ways that they are used by the microprocessor 54 is determined by a predetermined program stored in the ROM 56. All of the quantities that are displayed on display unit 60 are derived quantities, such as peak pressure, distance to ground zero, and the weapon yield for example. These derived quantities are calculated by the microprocessor 54 under control of ROM 56 and displayed on the display unit 60 and/or operate the alarm units 62.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A monitoring system for detecting the effects of a nuclear explosion so as to assess the damage to personnel and property based on certain known characteristics of predetermined signals to be detected, comprising:

a sensor heat for detecting the predetermined signals, said head being spherical in shape; and an electronic signal processor operatively connected to said sensor head so as to process the predetermined signals according to a predetermined program so as to generate derived quantities from the certain known characteristics of the predetermined signals that can be used to generate derived quantities of blast data to assess damage from the nuclear explosion to property and personnel, said sensor head further comprising a plurality of temperature sensors strategically disposed about the top half thereof for sensing the thermal effects of the nuclear explosion and to provide information concerning the direction of the radiation.

2. The monitoring system of claim 1 wherein said sensor head further comprises a plurality of pressure sensors strategically disposed about the bottom half thereof and embedded therein for sensing the blast overpressure effects of the nuclear explosion.

3. The monitoring system of claim 2 wherein each one of said pressure sensors of said sensor head comprises:

a plate affixed to the inside surface of said sensor head; and a strain gauge affixed to said plate such that an incident blast wave from said nuclear explosion will deform and flex said plate in proportion to the intensity thereof, and such that said strain gauge reacts so as to change its resistance thereby indicating the intensity of the wave front.

4. The monitoring system of claim 3 wherein said sensor head further comprises means for sensing the gamma radiation effects of the nuclear explosion disposed strategically about the top half of said sensor head.

5. The monitoring system of claim 4 wherein said means for sensing the gamma radiation effects comprises a low intensity sensor and a high intensity sensor.

6. The monitoring system of claim 5 wherein said sensor head further comprises means for sensing the neutron radiation effects of the nuclear explosion disposed strategically about the bottom half of said sensor head.

7. The monitoring system of claim 6 wherein said means for sensing the neutron radiation effects comprises a low intensity neutron sensor and a high intensity neutron sensor.

8. The monitoring system of claim 7 wherein said electronic signal processor comprises:

a temperature analog-to-digital (A/D) converter operatively connected to said plurality of temperature sensors for converting the purely analog temperature signals generated thereby into a digital representation which is outputted onto a data bus; and a pressure analog-to-digital (A/D) converter operatively connected to said plurality of pressure sensors for converting the purely analog pressure signals generated thereby into a digital representation which is outputted onto the data bus.

9. The monitoring system of claim 8 wherein said electronic signal processor further comprises:

a gamma counter operatively connected to said means for sensing the gamma radiation;

a neutron counter operatively connected to said means for sensing the neutron radiation; and a system clock operatively connected to said gamma counter and to said neutron counter such that when clocked at predetermined intervals, said gamma counter counts the signal representative of the gamma radiation, making it available at its output, and such that when clocked at the predetermined intervals, said neutron counter counts the signal representative of the neutron radiation making it available at its output.

10. The monitoring system of claim 9 wherein said electronic signal processor further comprises:

a gamma latch operatively connected at its input to the output of said gamma counter and its output to the data bus;

a neutron latch operatively connected at its input to the output of said neutron counter and at its output to the data bus; and an address decoder operatively connected at its input to an address bus and at individual outputs to corresponding individual control inputs of said temperature A/D converter, said pressure A/D converter, said gamma latch, and said neutron latch such that addresses at the input of said address decoder are decoded and in response said decoder then pulsing the control inputs according to the addresses.

11. The monitoring system of claim 10 wherein said electronic signal processor further comprises:

a microprocessor operatively connected to the data bus and the address bus;

a read-only memory (ROM) operatively connected to said microprocessor; and a direct access memory operatively connected to the data bus, to the address bus and to said microprocessor, such that data on the data bus are stored in predetermined locations in said direct access memory for use and computation by said microprocessor as determined by a predetermined program stored in said ROM.

12. The monitoring system of claim 11 wherein said electronic signal processor further comprises:

a keyboard operatively connected to said microprocessor for resetting or initiating operation of said monitoring system;

an alarm unit operatively connected to said microprocessor for sounding an alarm upon the detection of any one of the predetermined signals; and a display unit operatively connected to said microprocessor for displaying quantities derived from the predetermined signals, such as peak pressure, distance to ground zero and weapon yield, gamma dose and dose rate, neutron dose and dose rate, direction of the nuclear explosion, thermal radiation intensity and the type of weapon.

* * * * *